(No Model.) 2 Sheets—Sheet 1.

W. McMAHON.
DUMPING BOAT.

No. 525,794. Patented Sept. 11, 1894.

WITNESSES:
Edward C. Rowland
James M. Paul

INVENTOR
William McMahon
BY
T. F. Bourne
his ATTORNEY (No Model.) 2 Sheets—Sheet 2.
W. McMAHON.
DUMPING BOAT.
No. 525,794. Patented Sept. 11, 1894.
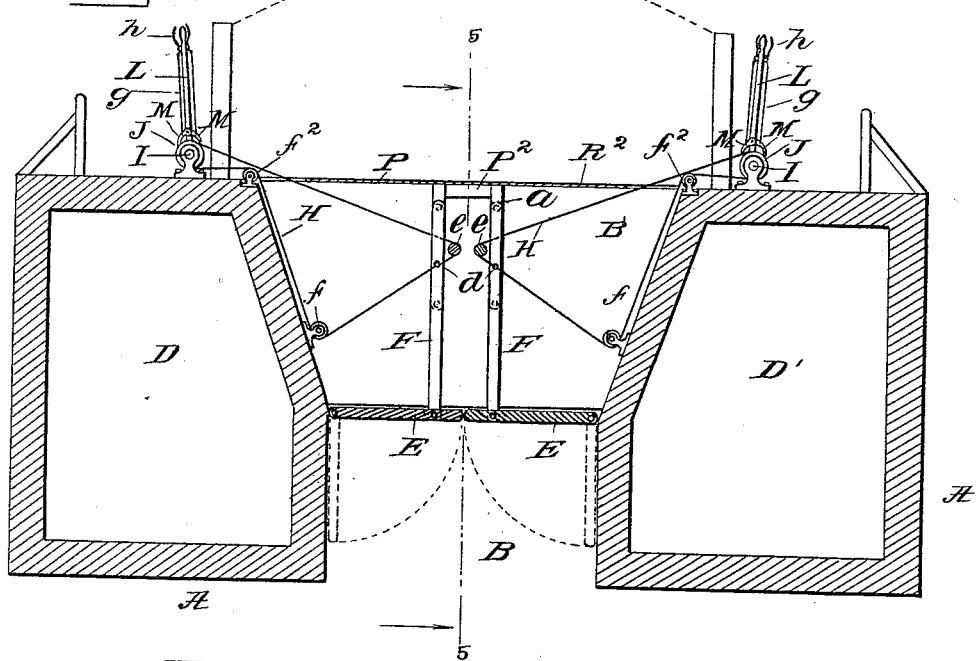
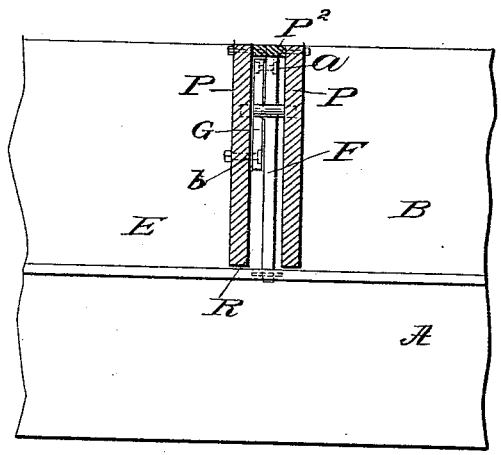
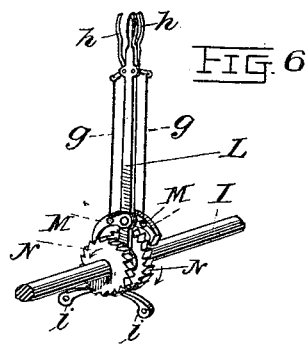
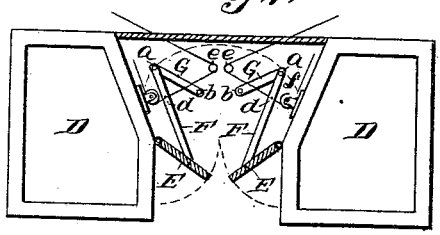
WITNESSES:
Edward A. Rowland.
James M. Paul
INVENTOR
William McMahon
BY
T. F. Bourne
his ATTORNEY

United States Patent Office.

WILLIAM McMAHON, OF RAHWAY, NEW JERSEY.

DUMPING-BOAT.

SPECIFICATION forming part of Letters Patent No. 525,794, dated September 11, 1894.

Application filed August 6, 1892. Renewed June 6, 1894. Serial No. 513,706. (No model.)

*To all whom it may concern:*

Be it known that I, WILLIAM McMAHON, a citizen of the United States, and a resident of Rahway, in the county of Union and State of New Jersey, have invented certain new and useful Improvements in Dumping-Boats, of which the following is a specification.

My invention has relation to dumping boats or scows, and it has for its object to provide means whereby the load or refuse can be carried without danger of spontaneous dumping, and whereby at the desired time the load can be effectively dumped through the bottom of the boat or scow without interfering with the buoyancy or equilibrium of the boat and without danger to the operator.

The invention consists in the novel details of improvement and the combinations of parts that will be more fully hereinafter set forth and then pointed out in the claims.

Reference is to be had to the accompanying drawings forming part hereof, wherein—

Figure 1:
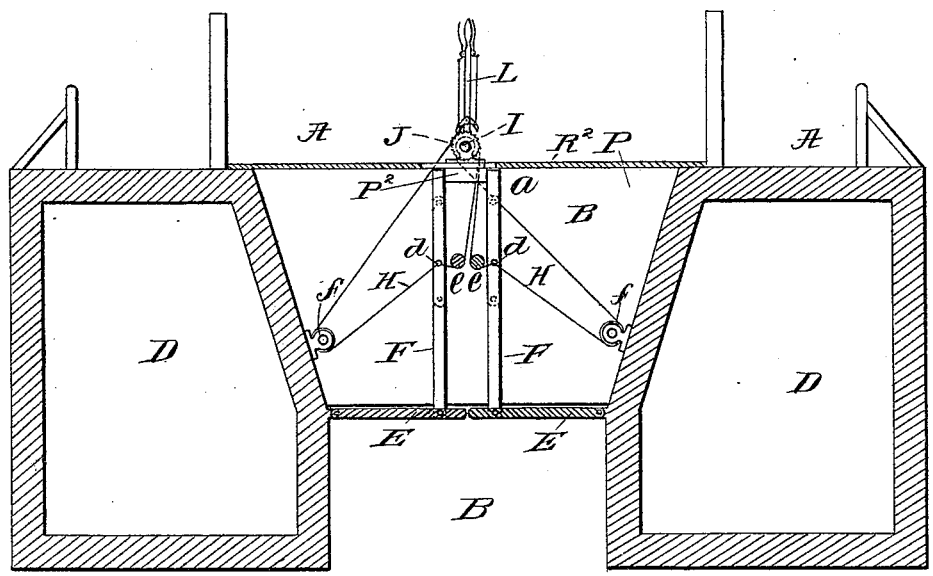
Figure 2:
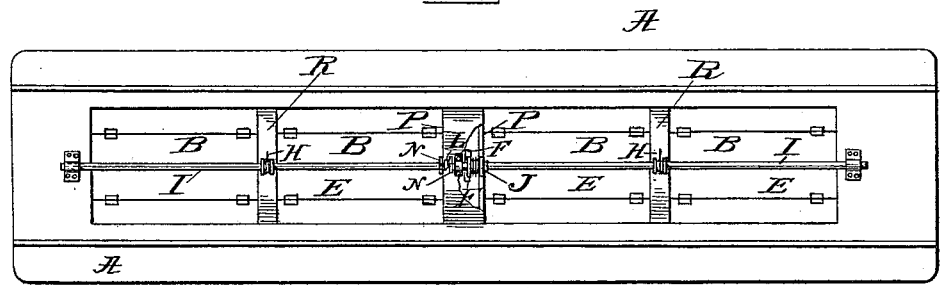
Figure 3:
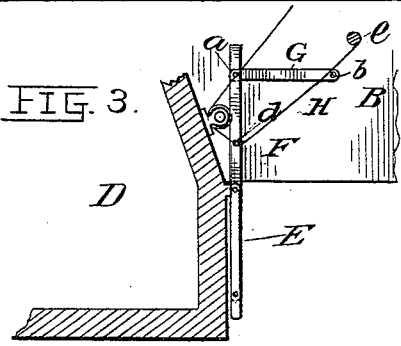

Figure 1 is a vertical cross section of a boat or scow embodying my improvements, showing my preferred means for manipulating the gates or supports for the refuse or load. Fig. 2 is a plan view, partly broken, of the boat or scow, on a reduced scale. Fig. 3 is a detail section showing the bottom or gates swung down to permit dumping of the load. Fig. 4, is a view similar to Fig. 1, showing independent shafts for actuating the bottom or gates of the boat. Fig. 5 is a vertical longitudinal sectional detail view on the plane of the line 5, 5, in Fig. 4, looking in the direction of the arrows. Fig. 6 is a perspective view of means to actuate the main shaft, and Fig. 7 is a cross sectional detail view showing the gates or bottom and their actuating levers in the midway position.

In the accompanying drawings the letter A, indicates a boat, scow or the like adapted to receive ashes or other refuse or material to be dumped, and for this purpose it is provided with a central longitudinal compartment or compartments B (see Fig. 2). The boat or scow A is preferably constructed with water tight compartments D along the sides to give buoyancy and strength, the sides of the boat at the ends being rigidly held together.

E, E, are bottom boards, gates or supports for the load in the compartment B, and they are pivotally carried within the compartment B, and arranged to extend across the same, as in Figs. 1 and 4, so that when released to swing down they will dump the load (see Fig. 3). The bottom boards, gates or supports E, E, are preferably pivoted at their outer edges so as to turn on their longitudinal axes to enable them when swung down to lie about parallel with the vertical sides of the compartment B so as not to interfere with the free exit of the load through the bottom of the boat. By this means the boat will always remain in the normal position in the water either with or without a load.

To firmly support the swinging bottom or gates E, and yet permit ready manipulation of the same I have provided levers that may be connected and operated as follows:—To the bottom board or gates E, E, are pivotally connected levers or bars F, F, that normally stand substantially upright as indicated. These levers or bars F, F, are preferably pivotally connected with the gates or supports E, E, near the free longitudinal edges of the latter as shown, to give greater ease in lifting the gates. The levers or bars F, F, are also pivotally connected with swinging supports and for this purpose at or near their upper ends they are pivoted, as at $a$, to levers or links G, G, that, at or near their lower ends, are pivotally connected, as at $b$, with a rigid support carried by the boat A. This arrangement is more clearly shown in Fig. 5, wherein the edges of both the levers F, and G, are shown, whereas in Figs. 1 and 4 the levers G are directly back of levers F. With this construction when the parts are in their normal positions, the levers F, G, being about parallel side by side, and the pivots $a$, $b$, aligned, the levers F are supported, and held from longitudinal movement, as the downward strain is communicated from pivot $a$, of lever F, to lever G, and from thence to pivot $b$, whereby the bottom, gates or supports E, are firmly held up to sustain the load upon them. The bottom or gates E, and levers F cannot swing down until the upper ends of levers F, F, are moved sidewise, whereupon the levers G, G, will also swing sidewise by turning on pivots $b$, carrying the pivots $a$, $b$, out of vertical alignment, thereby enabling the parts to assume the positions shown in Fig. 3, by which means the load can be dumped. To actuate the levers F, F, in order to raise and lower the bottom or gates E, E, I swing said levers outwardly and inwardly or toward and from each other, the levers G, G, then acting to raise the levers F, or permit them to descend, and for this purpose I prefer to connect to each lever F, an endless rope, chain or other suitable connection H, as indicated, and to operate it in any suitable manner. For the latter purpose I have shown in Fig. 1 a longitudinal shaft I, extending about centrally over the compartment B, and mounted in suitable bearings on the boat, which shaft carries a suitable drum or the like J, over which the rope or connection H passes, so that it can be operated in either direction. The ropes or connections H, are shown connected with the levers F, as at $d$, and extend therefrom on opposite sides, and thence around drum J. In Fig. 1, the ropes or connections H pass over sheaves or pulleys $e$, located, preferably, between the levers F, F, and thence on and around the drum J from the same side thereof. The ropes or connections H next pass from the other side of drum J to sheaves or pulleys $f, f$, on the walls of compartment B (or any other suitable support), whereby the ropes or connections H can be drawn in opposite directions to move the levers F, G, as desired.

The shaft I can be turned to operate the levers F by any suitable means. One means I have shown consists of a lever L, hung on the shaft I, and having pawls M, M, to engage ratchet wheels N, N, secured to the shaft I (see Fig. 6). The ratchets N, N, extend in opposite directions as do the corresponding pawls M, M, so that the shaft I can be turned to the right or left as may be desired. Either pawl M, M, can be disengaged from its ratchet to permit movement of the lever L, and for this purpose I have shown each pawl M connected by a rod $g$, with a handle $h$, on the lever L. But of course other suitable means can be used for this purpose if desired. Pawls $i, i$, engaging ratchets N, N, (see Fig. 6) prevent backward movement of the shaft I, and said pawls can be thrown in and out of gear as may be desired. In place of the lever L a wheel or other device can be used to turn the shaft I.

In Fig. 4, instead of a single shaft I running over the center of the boat A, I have shown two shafts I, one on each side of the compartment B, each shaft being provided with means to turn it in either direction as shown. In this case each rope or connection H passes over corresponding pulleys $e, f$, and $f^2$, and over a drum J, on each shaft. By the foregoing means each bottom, gate or support E can be operated independently.

In order to insure the proper operation of the levers F, F, and their connecting parts I prefer to place double partitions P, P, across the compartment B, leaving a space or compartment R, between said partitions. (See Figs. 2 and 5.) In this case the pivot $b$, and pulleys $e, e$, can be carried by said partitions P, as shown (see Figs. 1 and 3). The lower edges of the partitions P, P, preferably rest against the upper sides of the bottom boards, or gates E (or nearly so) when the latter are raised, so as to prevent refuse, &c., from reaching the compartment R. The levers F, G, ropes or connections H, pulleys, &c., are located between the partitions P, P, in the compartment R, and therefore these parts are kept from contact with the refuse or load in the compartment B, whereby the mechanism is free to work at all times. This is an essential point for if the parts become clogged up great damage might result.

The upper ends of the levers F, F, in their normal positions preferably rest against a bar or stop $P^2$, placed between the partitions P, P, (see Figs. 1, 3 and 5) which limits the movement of said levers so that they cannot cross each other, and helps to hold them steady as well. A board or cover $R^2$, may be placed over the compartment R, to exclude refuse, &c., upon which board the operator may stand to operate the bottom or gates E, as well as to cross from side to side of the boat. Any desired number of these partitions P, P, and compartments R, with the inclosed operating mechanism may be used according to the size of the boat and the work to be accomplished. Three compartments R are indicated in Fig. 2, whereby the main compartment B is divided into four parts. I contemplate placing a series of levers F, G, and their connecting parts at each end of the bottom board E, and as many as necessary between their ends. Although the bottom boards, gates or supports E, may extend the whole length of the compartment B it is evident that said bottom or gate E may be divided into as many lengths as desired. In this case each length would have one or more series of levers F, G, and proper parts to operate them.

Although I have shown the bottom, gate or support E in two parts longitudinally, it is evident that a single bottom board or gate, with its appropriate lifting mechanism could be used, but when I split the bottom or gate E centrally as in Figs. 1 and 4, it becomes easier to lift, and especially so if it should descend far enough to enter the water.

In the normal position when the bottom or gate E is closed the levers F, G, extend in line so that the longitudinal pressure on lever F, will be supported by lever G and pivots $a, b$. In this position the ropes or connections H when the shaft I is locked from turning hold the levers F from lateral movement, and thereby the bottom or gates E are properly supported. When the boat is to be dumped the shaft I is turned in such direction as to move the levers F outwardly. As they thus move the levers G will turn on their pivots and allow the levers F to descend, and thereby permit the bottom or gate E to sink and release the load, the levers G, then extending about horizontally as in Fig. 3. To raise the bottom or gate E the levers F are drawn inward or toward each other, whereupon the levers G turning upward on their pivots will tend to raise the levers F and gates E, to return them to their normal positions. It is this upward swinging of the levers G that insures the proper lifting of the gates E.

The construction herein specified will be found very simple and yet perfect in operation. The parts are not liable to get out of order, and can be operated with comparative ease as the arrangement of levers insures ready operation of the parts. When the load is upon the bottom or gates E, it will assist in dumping the boat or swinging down the gates as soon as the pivots $a$, $b$, have been moved out of vertical line sufficiently far to permit the lever G to turn freely on its pivot.

Of course I do not intend to limit myself to the arrangement shown for actuating the levers F, as other means can be employed for the purpose.

Having now described my invention, what I claim is—

1. The combination of a rigid receptacle having a compartment and a bottom or gate, with a lever connected thereto, a movable support for said lever, and means substantially as described for actuating said lever, said lever and support being arranged parallel in their normal positions, substantially as specified.

2. The combination of a bottom or gate, with a lever connected thereto and another lever pivoted to the first mentioned lever and also having a separate pivot or support, and means for holding said pivot or support, the pivots of said levers being arranged in vertical line in their normal positions to hold up the first mentioned lever and the gate, substantially as described.

3. The combination of a bottom or gate and a lever F connected thereto, a lever G pivotally connected with the lever F, a pivot or support for the lever G, and means for holding said pivot or support, the pivots of said levers being arranged in substantial vertical alignment in their normal positions, and with means substantially as described for operating the lever F, substantially as specified.

4. The combination of a receptacle having a compartment B, with a bottom or gate hinged to said receptacle, a lever connected with said gate near its free edge, a lever G pivotally carried by the receptacle and also pivoted to the first mentioned lever so that the pivots of said levers are in substantial vertical alignment in their normal positions, as and for the purpose specified.

5. The combination of a rigid receptacle having a compartment open at its lower part, a bottom or gate pivoted to the receptacle, a lever connected to the gate, a support for holding said lever to support the gate, and means substantially as described to operate the lever, said support and lever being in vertical alignment in their normal positions, as and for the purpose specified.

6. The combination of a bottom or gate, a lever connected therewith, a movable support for said lever, said lever and support being in vertical alignment in their normal positions, a rope or connection connected with said lever, and a shaft connected with the rope or connection for actuating the latter, substantially as described.

7. The combination of a bottom or gate, a lever F connected therewith, a lever G pivotally connected with the lever F, and having a permanent pivot $b$, a rope or connection extending from the lever F, and a shaft and drum for said rope, with means for turning said shaft to actuate the lever F, substantially as described.

8. The combination of a bottom or gate, a lever F pivoted thereto, a lever G pivoted to the lever F, and having a separate pivot $b$, a rope or connection extending from opposite sides of the lever F, a shaft, a drum thereon upon which said rope works, a lever and ratchets for operating the shaft in opposite directions, and for holding the same from reverse movement, substantially as described.

9. A dumping boat having a compartment B, combined with gates E, E, levers F, F, connected therewith, movable supports for said levers, a shaft, a drum thereon, endless ropes or connections extending from said levers to said drums, one part of each of said ropes passing over one side of said drum, and the other parts of said ropes passing from the opposite side of said drum, and with means for turning said drum and shaft, whereby when the latter are turned in one direction the levers F will be moved either toward or from each other, substantially as and for the purpose specified.

Signed at New York, in the county of New York and State of New York, this 3d day of August, A. D. 1892.

WILLIAM McMAHON.

Witnesses:
ALEXR MELHADO,
WM. HOLZER.